(12) United States Patent
Johnson et al.

(10) Patent No.: US 8,490,878 B2
(45) Date of Patent: *Jul. 23, 2013

(54) PORTABLE HANDHELD DEVICE FOR WIRELESS ORDER ENTRY AND REAL TIME PAYMENT AUTHORIZATION AND RELATED METHODS

(71) Applicant: Securedpay Solutions, Inc., Pisgah, AL (US)

(72) Inventors: John M. Johnson, Atlanta, GA (US); Roy T. Nelson, Pisgah, AL (US); Christopher D. Faircloth, Macon, GA (US); Lance Larsen, Cincinnati, OH (US)

(73) Assignee: Securedpay Solutions, Inc., Pisgah, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/705,862

(22) Filed: Dec. 5, 2012

(65) Prior Publication Data

US 2013/0097087 A1    Apr. 18, 2013

Related U.S. Application Data

(63) Continuation of application No. 13/188,111, filed on Jul. 21, 2011, now Pat. No. 8,356,754, which is a continuation of application No. 12/753,970, filed on Apr. 5, 2010, now Pat. No. 8,011,587, which is a continuation of application No. 11/379,673, filed on Apr. 21, 2006, now Pat. No. 7,721,969.

(60) Provisional application No. 60/673,603, filed on Apr. 21, 2005.

(51) Int. Cl.
*G06K 7/10*    (2006.01)

(52) U.S. Cl.
USPC .............................. 235/472.02; 235/462.44

(58) Field of Classification Search
USPC ............ 235/462.44, 462.45, 462.46, 472.01, 235/472.02, 472.03
See application file for complete search history.

(56) References Cited

U.S. PATENT DOCUMENTS

| 4,569,421 | A | 2/1986 | Sandstedt |
| 4,722,054 | A | 1/1988 | Yorozu et al. |

(Continued)

FOREIGN PATENT DOCUMENTS

| EP | 1515266 | 3/2005 |
| WO | 0046959 | 8/2000 |

(Continued)

OTHER PUBLICATIONS

Terziyan et al., "Mobile E-Commerce Transaction Model", Tietotekniikan Tutkimusinstituutti, Information Technology Research Institute, Multimeetmobile Project, Dec. 2000, pp. 1-40.
Payment Card Industrty Data Security Standard, Visa, Version 1.0, Dec. 2004, pp. 1-12.
Wrona et al., "Mobile Payments—State of the Art and Open Problems (2001)", Lecture Notes in Computer Science, 2001, vol. 2232, Electronic Commerce, 2001, pp. 88-100.

*Primary Examiner* — Karl D Frech
(74) *Attorney, Agent, or Firm* — Allen, Dyer, Doppelt, Milbrath & Gilchrist, P.A.

(57) ABSTRACT

A portable handheld device for wireless order entry and real time payment authorization may include a portable housing, a display carried by the housing, an order entry input device carried by the housing, a transaction card input device carried by the housing for reading user sensitive information from a transaction card, a wireless transceiver carried by the housing, and a processor carried by the housing and connected to the display, order entry input device, transaction card input device and wireless transceiver. The processor may be for wirelessly sending input order information, and encrypting and wirelessly sending the user sensitive information from the transaction card without storing and without displaying. The processor may also be for wirelessly receiving and displaying payment authorization information based upon real time authorization from a transaction card issuing entity.

101 Claims, 7 Drawing Sheets

U.S. PATENT DOCUMENTS

| | | | |
|---|---|---|---|
| 5,157,717 A | 10/1992 | Hitchcock | |
| 5,334,824 A | 8/1994 | Martinez | |
| 5,387,784 A | 2/1995 | Sarradin | |
| 5,408,078 A | 4/1995 | Campo et al. | |
| 5,489,773 A | 2/1996 | Kumar | |
| 5,859,779 A | 1/1999 | Giordano et al. | |
| 6,234,389 B1 | 5/2001 | Valliani et al. | |
| 6,425,524 B2 | 7/2002 | Pentel | |
| 6,431,439 B1 | 8/2002 | Suer et al. | |
| 6,510,983 B2 | 1/2003 | Horowitz et al. | |
| 6,848,613 B2 | 2/2005 | Nielson et al. | |
| 6,848,615 B2 | 2/2005 | Yamagami | |
| 7,080,037 B2 | 7/2006 | Burger et al. | |
| 7,083,090 B2 | 8/2006 | Zuili | |
| 7,093,759 B2 | 8/2006 | Walsh | |
| 7,121,470 B2 | 10/2006 | McCall et al. | |
| 7,207,477 B1 | 4/2007 | Ramachandran | |
| 7,239,346 B1 | 7/2007 | Priddy | |
| 7,240,836 B2 | 7/2007 | Vrotsos et al. | |
| 7,254,560 B2 | 8/2007 | Singhal | |
| 7,275,685 B2 | 10/2007 | Gray et al. | |
| 7,376,583 B1 | 5/2008 | Rolf | |
| 7,478,065 B1 | 1/2009 | Ritter et al. | |
| 7,487,112 B2 | 2/2009 | Barnes, Jr. | |
| 7,493,283 B1 | 2/2009 | Philyaw | |
| 7,493,284 B2 | 2/2009 | Celi, Jr. et al. | |
| 7,533,047 B2 | 5/2009 | Hagale et al. | |
| 7,537,154 B2 | 5/2009 | Ramachandran | |
| 7,542,942 B2 | 6/2009 | Peart et al. | |
| 7,634,448 B1 | 12/2009 | Ramachandran | |
| 7,721,969 B2 | 5/2010 | Johnson et al. | |
| 7,748,617 B2 | 7/2010 | Gray | |
| 7,784,684 B2 | 8/2010 | Labrou et al. | |
| 7,809,169 B2 | 10/2010 | Martinez | |
| 7,822,688 B2 | 10/2010 | Labrou et al. | |
| 7,861,930 B2 | 1/2011 | Esplin et al. | |
| 7,865,448 B2 | 1/2011 | Pizarro | |
| 7,873,577 B1 | 1/2011 | Duhaime et al. | |
| 7,909,243 B2 | 3/2011 | Merkow et al. | |
| 7,922,077 B2 | 4/2011 | Humphrey et al. | |
| 7,927,211 B2 | 4/2011 | Rowe et al. | |
| 7,933,799 B2 | 4/2011 | Aaltonen et al. | |
| 7,953,968 B2 | 5/2011 | Robertson et al. | |
| 7,974,929 B2 | 7/2011 | Smith, III | |
| 7,991,694 B2 | 8/2011 | Takayama | |
| 8,011,575 B1 | 9/2011 | Ramachandran | |
| 8,011,587 B2 | 9/2011 | Johnson et al. | |
| 8,028,896 B2 | 10/2011 | Carter et al. | |
| 8,046,261 B2 | 10/2011 | Ghosh et al. | |
| 8,356,754 B2 * | 1/2013 | Johnson et al. | 235/472.01 |
| 2001/0037249 A1 | 11/2001 | Fitzgerald et al. | |
| 2002/0023054 A1 | 2/2002 | Gillespie | |
| 2002/0046185 A1 | 4/2002 | Villart et al. | |
| 2002/0052790 A1 | 5/2002 | Tomishima | |
| 2002/0077993 A1 | 6/2002 | Immonen et al. | |
| 2002/0087478 A1 | 7/2002 | Hudd et al. | |
| 2002/0095380 A1 | 7/2002 | Singhal | |
| 2002/0116329 A1 | 8/2002 | Serbetcioglu et al. | |
| 2003/0088469 A1 | 5/2003 | Leifer | |
| 2003/0102369 A1 | 6/2003 | Clark | |
| 2003/0115126 A1 | 6/2003 | Pitroda | |
| 2003/0121981 A1 | 7/2003 | Slutsky et al. | |
| 2003/0183690 A1 | 10/2003 | Yamagami | |
| 2003/0196084 A1 | 10/2003 | Okereke et al. | |
| 2004/0034564 A1 | 2/2004 | Liu | |
| 2004/0054592 A1 | 3/2004 | Hernblad | |
| 2004/0068441 A1 | 4/2004 | Werbitt | |
| 2004/0143512 A1 | 7/2004 | Sturr, Jr. | |
| 2004/0158494 A1 | 8/2004 | Suthar | |
| 2004/0158534 A1 | 8/2004 | Azami et al. | |
| 2004/0167820 A1 | 8/2004 | Melick et al. | |
| 2004/0172339 A1 | 9/2004 | Snelgrove et al. | |
| 2004/0267673 A1 | 12/2004 | Ballard et al. | |
| 2005/0043996 A1 | 2/2005 | Silver | |
| 2005/0065851 A1 | 3/2005 | Aronoff et al. | |
| 2005/0114367 A1 | 5/2005 | Serebrennikov | |
| 2006/0049256 A1 | 3/2006 | Von Mueller et al. | |
| 2006/0218040 A1 | 9/2006 | Sabapathypillai | |
| 2006/0271442 A1 | 11/2006 | Pfleging et al. | |
| 2007/0055630 A1 | 3/2007 | Gauthier et al. | |
| 2008/0091544 A1 | 4/2008 | Linlor | |
| 2008/0114699 A1 | 5/2008 | Yuan et al. | |
| 2008/0208744 A1 | 8/2008 | Arthur et al. | |
| 2008/0270301 A1 | 10/2008 | Jones et al. | |
| 2008/0313047 A1 | 12/2008 | Casares et al. | |
| 2009/0055278 A1 | 2/2009 | Nemani | |
| 2009/0055322 A1 | 2/2009 | Bykov et al. | |
| 2009/0068982 A1 | 3/2009 | Chen et al. | |
| 2009/0083160 A1 | 3/2009 | Hagale et al. | |
| 2009/0094100 A1 | 4/2009 | Xavier | |
| 2009/0094125 A1 | 4/2009 | Killian et al. | |
| 2009/0099961 A1 | 4/2009 | Ogilvy | |
| 2009/0119181 A1 | 5/2009 | Pratt et al. | |
| 2009/0138366 A1 | 5/2009 | Bemmel et al. | |
| 2009/0192898 A1 | 7/2009 | Baril | |
| 2009/0192935 A1 | 7/2009 | Griffin et al. | |
| 2009/0216680 A1 | 8/2009 | McCown et al. | |
| 2009/0216681 A1 | 8/2009 | McCown | |
| 2009/0233579 A1 | 9/2009 | Castell et al. | |
| 2009/0240626 A1 | 9/2009 | Hasson et al. | |
| 2009/0248579 A1 | 10/2009 | Kaminski et al. | |
| 2009/0307096 A1 | 12/2009 | Antonellis | |
| 2009/0307132 A1 | 12/2009 | Phillips | |
| 2009/0307139 A1 | 12/2009 | Mardikar et al. | |
| 2009/0307140 A1 | 12/2009 | Mardikar | |
| 2009/0307142 A1 | 12/2009 | Mardikar | |
| 2009/0313165 A1 | 12/2009 | Walter | |
| 2009/0327130 A1 | 12/2009 | Labaton | |
| 2010/0049615 A1 | 2/2010 | Rose et al. | |
| 2010/0082444 A1 | 4/2010 | Lin et al. | |
| 2010/0082481 A1 | 4/2010 | Line et al. | |
| 2010/0082490 A1 | 4/2010 | Rosenblatt et al. | |
| 2010/0125510 A1 | 5/2010 | Smith et al. | |
| 2010/0131347 A1 | 5/2010 | Sartipi | |
| 2010/0161403 A1 | 6/2010 | Fisher et al. | |
| 2010/0161433 A1 | 6/2010 | White | |
| 2010/0174647 A1 | 7/2010 | Kowalchyk et al. | |
| 2010/0191653 A1 | 7/2010 | Johnson et al. | |
| 2010/0198725 A1 | 8/2010 | Naccache | |
| 2010/0211507 A1 | 8/2010 | Aabye et al. | |
| 2010/0223145 A1 | 9/2010 | Dragt | |
| 2010/0223146 A1 | 9/2010 | Entenmann | |
| 2010/0235283 A1 | 9/2010 | Gerson | |
| 2010/0241467 A1 | 9/2010 | Saw et al. | |
| 2010/0274678 A1 | 10/2010 | Rolf et al. | |
| 2010/0280956 A1 | 11/2010 | Chutorash et al. | |
| 2011/0071914 A1 | 3/2011 | Beasley et al. | |
| 2011/0099079 A1 | 4/2011 | White | |
| 2011/0112920 A1 | 5/2011 | Mestre et al. | |
| 2011/0112968 A1 | 5/2011 | Florek et al. | |
| 2011/0119141 A1 | 5/2011 | Hoyos et al. | |
| 2011/0131102 A1 | 6/2011 | Wang | |
| 2011/0153437 A1 | 6/2011 | Archer et al. | |
| 2011/0161188 A1 | 6/2011 | Roberts | |
| 2011/0184821 A1 | 7/2011 | Mon et al. | |
| 2011/0191161 A1 | 8/2011 | Dai | |
| 2011/0191196 A1 | 8/2011 | Orr et al. | |
| 2011/0195748 A1 | 8/2011 | Main et al. | |
| 2011/0231270 A1 | 9/2011 | Dykes et al. | |
| 2011/0246317 A1 | 10/2011 | Coppinger | |
| 2011/0251910 A1 | 10/2011 | Dimmick | |
| 2011/0251955 A1 | 10/2011 | Lam | |

FOREIGN PATENT DOCUMENTS

| | | |
|---|---|---|
| WO | 0229708 | 4/2002 |
| WO | 03038706 | 5/2003 |
| WO | 03049359 | 6/2003 |
| WO | 03067369 | 8/2003 |
| WO | 2004028177 | 4/2004 |
| WO | 2005001610 | 1/2005 |
| WO | 2005098597 | 10/2005 |

* cited by examiner

PORTABLE HANDHELD DEVICE FOR WIRELESS ORDER ENTRY AND REAL TIME PAYMENT AUTHORIZATION AND RELATED METHODS

FIELD OF THE INVENTION

The present invention relates to the field of wireless networks, and, more particularly, to wireless order entry systems and related methods.

BACKGROUND OF THE INVENTION

Wireless networks are gaining in popularity for point-of-sale (POS) applications, such as in stores and restaurants, for example. Such networks typically include a server or other computer which communicates wirelessly via a wireless router with a plurality of handheld wireless devices, such as personal digital assistants (PDAs) carried by waiters, store personnel, etc. The portable wireless devices may be used for taking orders, checking inventory, and various other tasks which makes employees more efficient because they do not have to continuously return to a fixed computer or terminal location.

Various prior art wireless POS systems are known. One example is disclosed in U.S. Patent Publication No. 2002/0095380, which is directed to a payment system for the restaurant industry that facilitates efficient payment using a bankcard for a meal in a restaurant. This is done without providing personal sensitive data from bankcards to employees/waiters of the restaurant. The payment system includes a central system, a portable wireless device, a card processor and a merchant system and a bill with a service code that identifies the merchant, the table and the server.

One unfortunate result of the migration to wireless POS networks is that skimming and counterfeit fraud has significantly increased within the POS environment. Prior to the introduction of real-time terminal authorization, criminals were able to create false cards simply by obtaining card information from disregarded sales receipts. In today's electronic world, the authorization terminal reads additional information included on the card's magnetic stripe. Simple hand held devices are now available to criminals that can be used to "skim" the magnetic stripe and obtain all the information needed for the creation of a fraudulent card.

In recent years, the industry has witnessed significant growth in this abusive practice with the development of small, portable devices, which can store hundreds of account numbers at a time. Once in possession of a customer's credit card, the criminal can run the card through this easily concealed device and in seconds access and store the magnetic stripe information. Skimming usually occurs in businesses where the normal transaction requires the cardholder to give up possession of the card, such as in restaurants.

One prior art system which provides some measure of protection against fraudulently copied credit card information is set forth in U.S. Patent Publication No. 2006/0049256. This published application discloses a secure magnetic stripe card stripe reader (MSR) module and software system capable of encrypting the magnetic stripe data to CPI, SDP and LISP standards for use in POS and other applications requiring data security using non-secure networks and computing devices. The MSR module may also provide detection of fraudulently copied magnetic stripe cards.

Despite the benefits of such systems, further security features may be desirable in certain wireless POS network systems.

SUMMARY OF THE INVENTION

In view of the foregoing background, it is therefore an object of the present invention to provide a portable handheld device, system, and related methods for wireless order entry and real time payment authorization with desired security features and related methods.

This and other objects, features, and advantages in accordance with the present invention are provided by a portable handheld device for wireless order entry and real time payment authorization which may include a housing, a display carried by the housing, an order entry input device carried by the housing, a transaction card input device carried by the housing for reading user sensitive information from a transaction card, and a wireless transceiver carried by the housing. The portable handheld device may further include a processor carried by the housing and connected to the display, order entry input device, transaction card input device and wireless transceiver for wirelessly sending input order information, and encrypting and wirelessly sending the user sensitive information from the transaction card without storing and without displaying. Moreover, the processor may also be for wirelessly receiving and displaying payment authorization information based upon real time authorization from a transaction card issuing entity.

More particularly, the portable handheld device may further include a debit personal identification number (PIN) input device carried by the housing and connected to the processor. As such, the processor may also wirelessly encrypt and send debit PIN information without storing and without displaying. The wireless transceiver may be a wireless local area network (WLAN) transceiver, for example. Additionally, the processor may send and receive information via a Secure Sockets Layer (SSL) protocol.

The display may be a touch screen, for example, and the order entry input device may include a user manipulated stylus cooperating with the touch screen. The portable handheld device may further include a printer carried by the housing, and the processor may also be for printing a transaction receipt. By way of example, the portable handheld device may be for restaurant order entry, and it may include a memory storing restaurant menu data.

The portable handheld device may also include a volatile memory storing a private key for encryption. More particularly, at least one tamper resistant structure associated with the volatile memory. Also, the portable handheld device may include a battery carried by the housing and powering the volatile memory, and the at least one tamper resistant structure may include an encapsulant surrounding the battery and the volatile memory.

A system for wireless order entry and real time payment authorization via the Internet may include a wireless network router connected to the Internet, and at least one portable handheld device, such as the one described briefly above. In addition, a wireless order entry and real time payment authorization method aspect may include providing a portable handheld device, such as the one described briefly above, wirelessly sending input order information from the portable handheld device, and encrypting and wirelessly sending the user sensitive information from the portable handheld device without storing and without displaying. The method may further include wirelessly receiving and displaying payment authorization information at the portable handheld device based upon real time authorization from a transaction card issuing entity.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
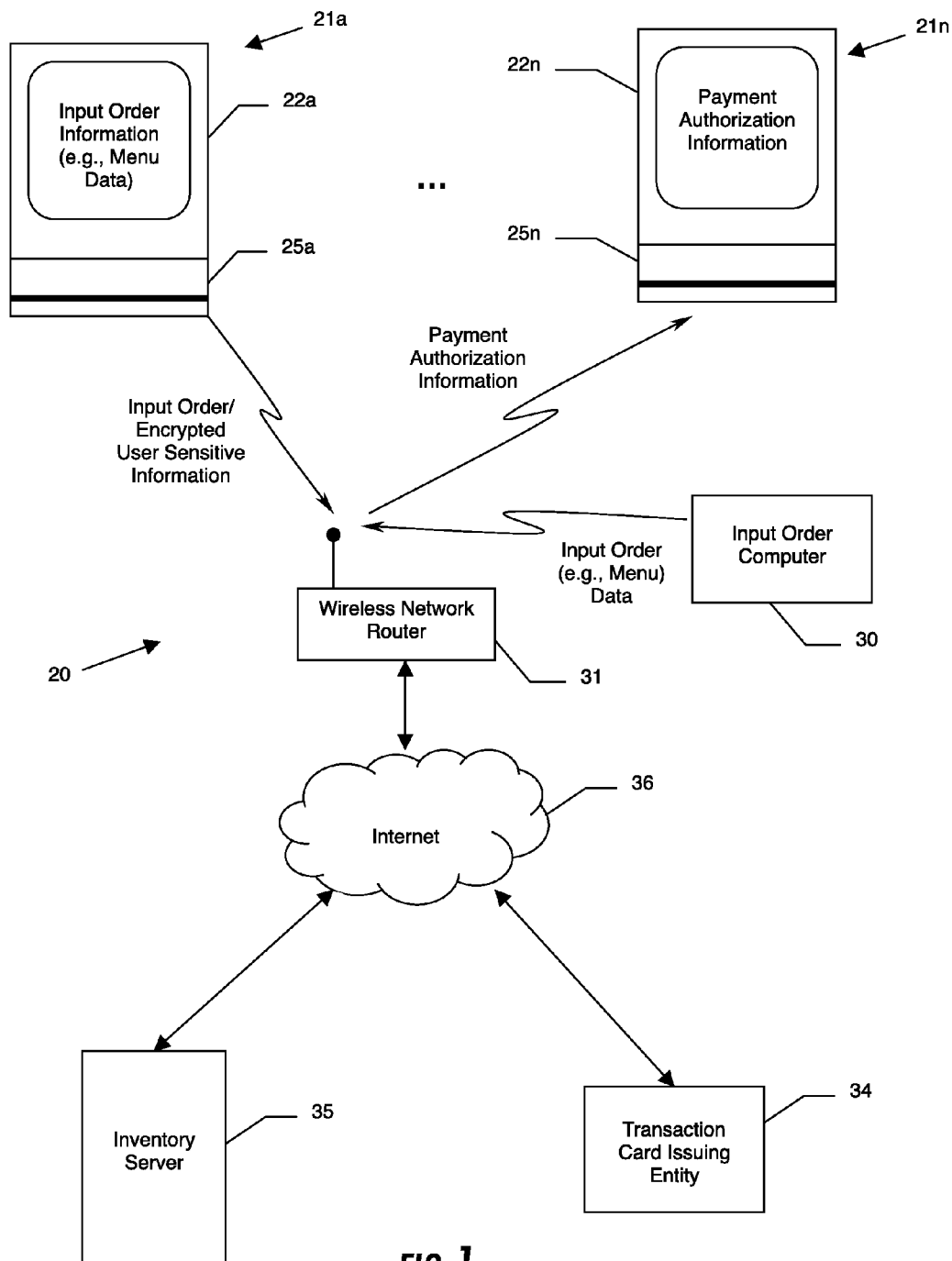
FIG. 1 is a schematic block diagram of a system for wireless order entry and real time payment authorization in accordance with the present invention.
Figure 2:
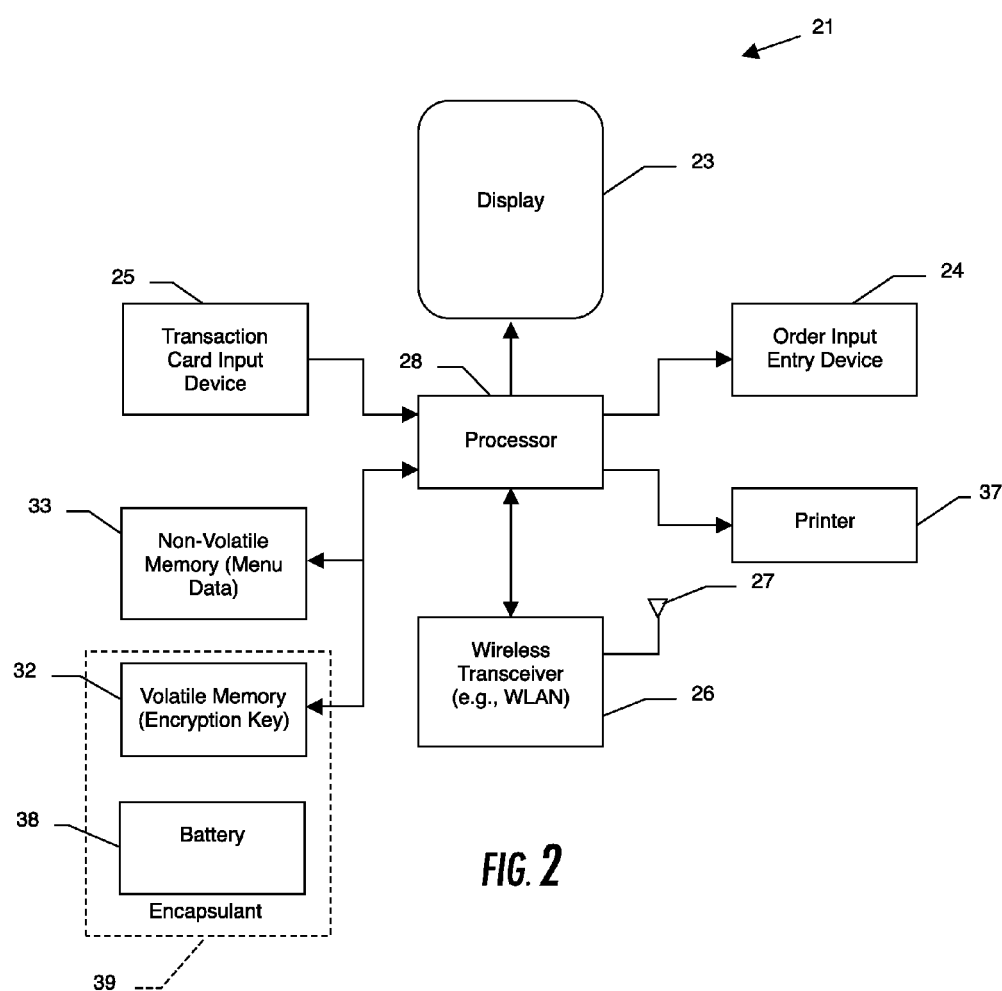
FIG. 2 is a schematic block diagram of an exemplary portable handheld device for use in the system of FIG. 1.
Figure 3:
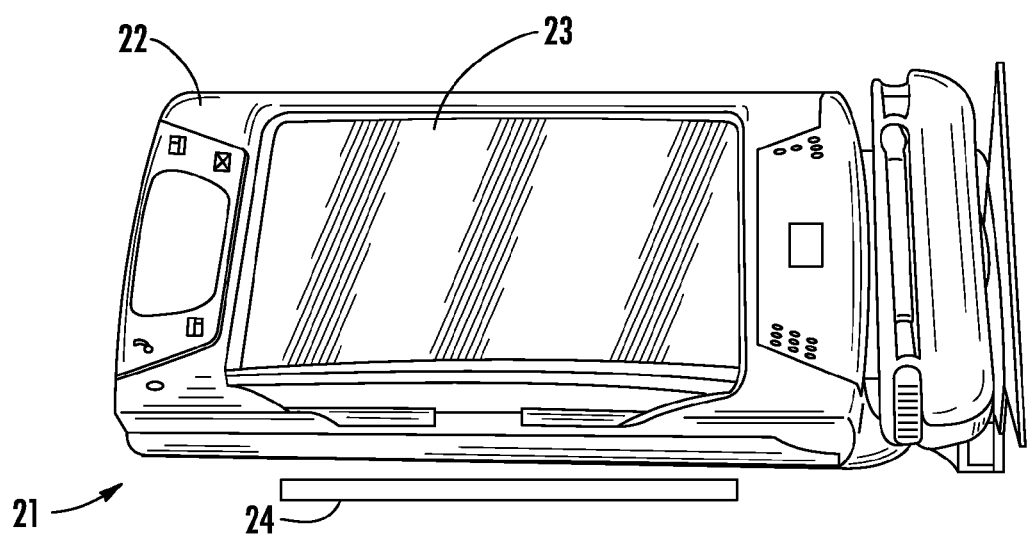
FIG. 3 is perspective view of an exemplary portable handheld device for use in the system of FIG. 1.
Figure 4:
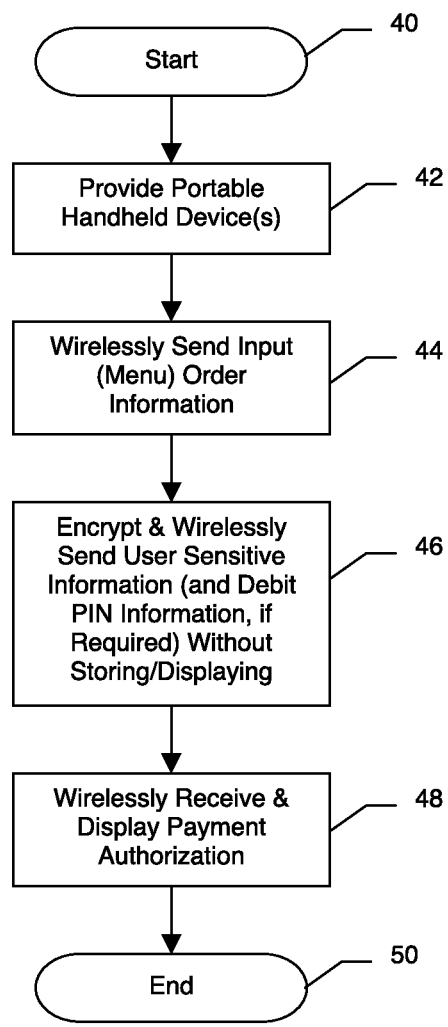
FIGS. 4 and 5 are flow diagrams illustrating wireless order entry and real time payment authorization method aspects of the present invention.

Referring initially to FIGS. 1 through 5, a system 20 for wireless order entry and real time payment authorization, such as a point-of-sale (POS) system, for example, and related methods are first described. The system 20 illustratively includes one or more portable handheld devices 21a-21n. By way of example, the portable handheld devices 21a-21n may be personal digital assistant (PDA) devices, as will be discussed further below, but other suitable portable handheld devices may also be used. By way of example, one exemplary PDA which may be used is an HP & FAQ HX4700. The portable handheld devices 21a-21n may include secure data and/or programs that are used to securely send user sensitive information, such as credit card and debit PIN information, over a wireless POS network. As such, the portable handheld devices may advantageously be configured by a third party vendor and provided to a retail store, restaurant, etc. for enhanced security, as will be discussed further below, at Blocks 40, 42 (FIG. 4).

The portable handheld devices 21 illustratively include a portable housing 22, a display 23 carried by the housing, and an order entry input device 24 also carried by the housing. In the illustrated embodiment (FIG. 3), the input device is a user manipulated stylus (which is removed from its carrying slot in the housing 22 for clarity of illustration), and the display 23 is a touch screen. It should be noted that in other embodiments different input devices may be used, such as a keypad, buttons, etc., or the touch screen may be the sole order entry/user input device (with or without a stylus 24).

The portable handheld devices 21a-21n further illustratively include a respective transaction card input device, which in the illustrated embodiments are magnetic card readers 25a-25n, although other suitable transaction card input devices may also be used. Each magnetic card reader 25 is carried by the housing 22 for reading user sensitive information from a transaction card, such as a credit or debit card, as will be appreciated by those skilled in the art. The portable handheld devices 21a-21n also include a wireless transceiver 26 and associated antenna 27 carried by the housing 22. By way of example, the above-noted PAQ HX4700 includes a wireless IEEE 802.11b IEEE internal transceivers.

Furthermore, a processor 28 is also carried by the housing 22 and is illustratively connected to the display 23, order entry input device 24, transaction card input device 25 and wireless transceiver 26. The processor 28 may thus wirelessly send input order information obtained from the order input entry device 24 via the wireless transceiver 26 to the appropriate location, at Block 44. For example, in the illustrated embodiment the processor 28 may send the input order information to an input order computer 30 via a wireless network router 31. More particularly, the wireless network router 31 may be a wireless LAN router, such as an IEEE 802.11x or Bluetooth router, for example.

The input order computer 30 may provide a centralized collection point for orders to be filled by kitchen workers (i.e., cooks) in the case of a restaurant, or other product orders in a retail environment, as will be appreciated by those skilled in the art. It should be noted that in some embodiments the input order information may be sent to a network printer in the restaurant kitchen directly and not received or processed by the input order computer 30.

Figure 5:
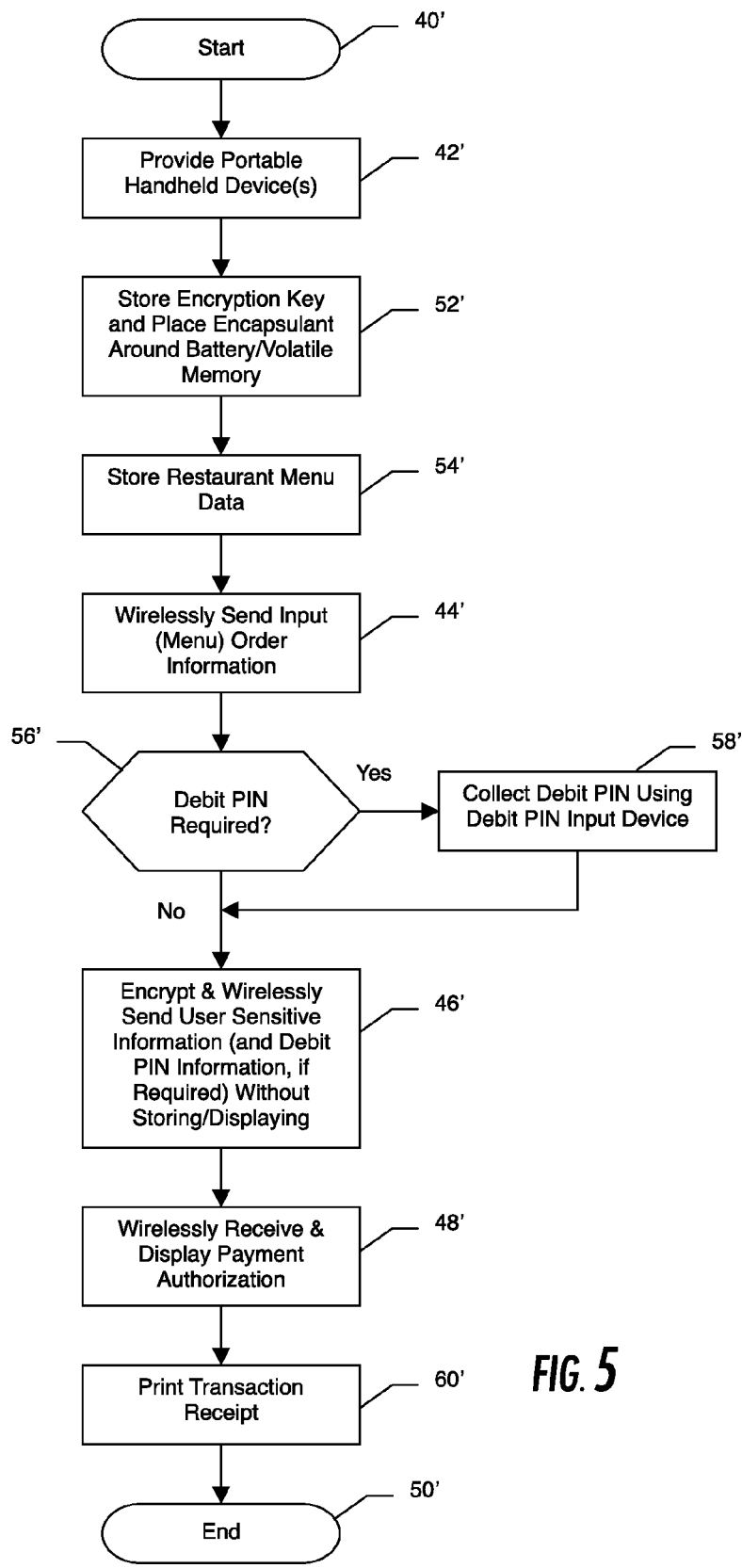

The portable handheld devices 21a-21n further illustratively include a volatile memory 32 for storing encryption data, such as a private encryption key, at Block 52' (FIG. 5). To provide enhanced protection against potential tampering to compromise the volatile memory and gain access to the sensitive data thereof, a tamper resistant structure such as an encapsulant (e.g., an epoxy) 39 may be placed around a volatile memory 32 and a battery 38 of the portable handheld device 21 (FIG. 2), as will be discussed further below.

A non-volatile memory 33 (e.g., FLASH or optical disk drive) is for storing other information such as operating system and application programs, and input order (e.g., menu) data provided by the input order computer 30 (Block 54'), etc. That is, the non-volatile memory 33 may store a menu that it downloads from the input order computer 30 (or other source), which may advantageously be changed from time-to-time on the premises where the portable handheld devices 21a-21n are being used. Of course, it should be noted that other data such as operating system and application program updates, etc., may also be uploaded to the portable handheld devices 21a-21n. It should also be noted that separate memories 32 and 33 need not be used in all embodiments, i.e., a single memory may be used for storing all of the data (both secure and unsecure).

Access to the cryptographic data (e.g., private cryptographic key, cryptographic software components, etc.) in the volatile memory 32 may advantageously be restricted or blocked from the input order computer 30 for security purposes, as will be discussed further below. The processor 28 also advantageously encrypts and wirelessly sends the user sensitive information from a transaction card (e.g., debit or credit) without storing and without displaying same, at Block 46 (FIG. 4), as will also be discussed further below. This advantageously helps reduce the chance of a criminal or even an employee—with access to a portable handheld device 21 from obtaining the user sensitive information. The processor 28 also is for wirelessly receiving and displaying payment authorization information based upon real time authorization from a transaction card issuing entity, at Block 48, thus concluding the method illustrated in FIG. 4 (Block 50).

Figure 6:
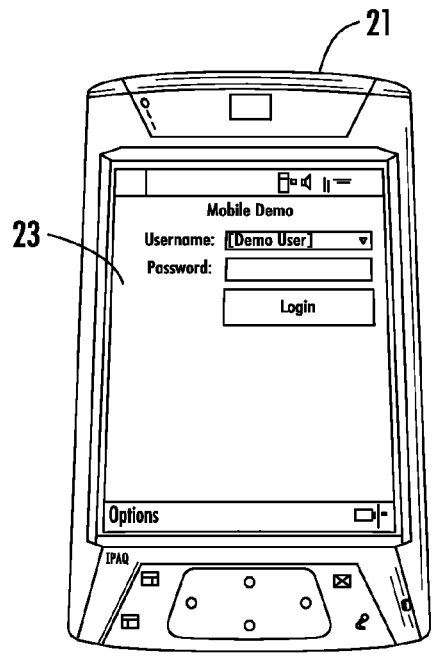
FIGS. 6 through 9 are front views of the portable handheld device of FIG. 3 displaying login, function selection, input (menu) order, and debit PIN entry screens, respectively.
Figure 7:
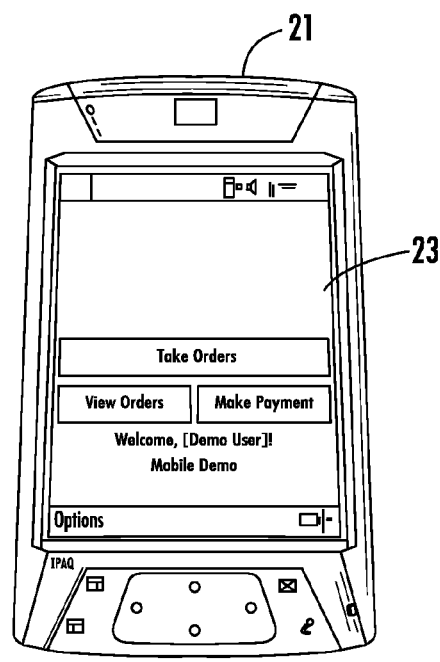
Figure 8:
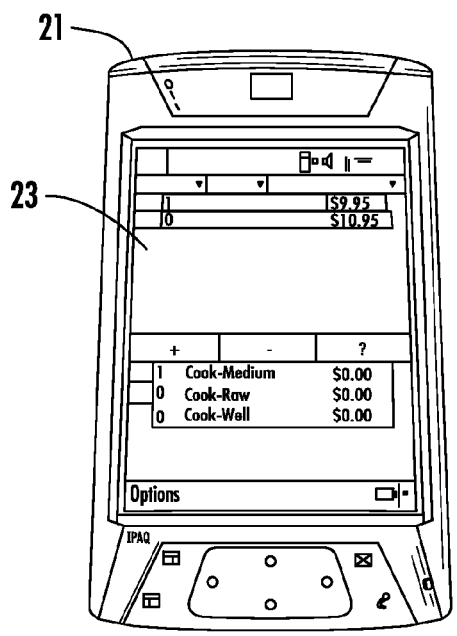

An exemplary sequence of operational display screens of the portable handheld devices 21a-21n are shown in FIGS. 6-8. In a first display screen (FIG. 6), the processor 28 prompts a user (e.g., a waiter/waitress, manager, etc.) to provide a user name and password to gain operational access to the portable handheld device 21. Once authenticated, a second display screen (FIG. 7) provides the user with a choice of various operations or functions that can be performed, such as displaying a menu for taking orders (FIG. 8), viewing previously submitted orders, and processing payments for orders.

Figure 9:
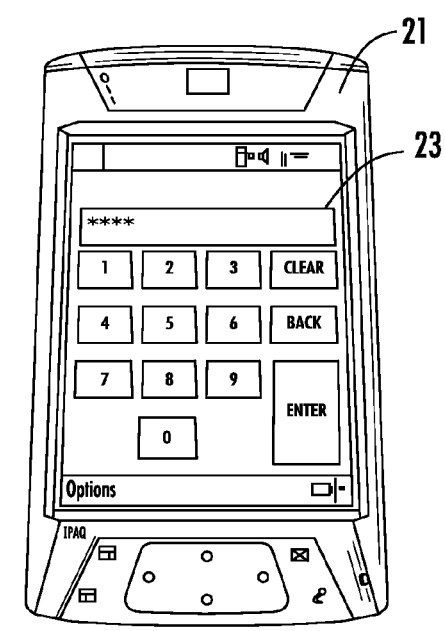

Most debit or check cards typically require a user to provide a personal identification number (PIN) at the time of purchase. Similarly, some credit card transactions require users to provide an identifying number, such as a billing zip code, for example. To this end, the portable handheld devices 21a-21n may further include a debit personal identification number (PIN) input device, such as a touch screen (with or without stylus), as illustrated in FIG. 9. Here again, other PIN input devices such as a keyboard, etc., may also be used.

Thus, for transactions where a PIN or other identifying indicia is required (Block 56'), the processor 28 collects the debit PIN via the debit PIN input device (Block 58') and also preferably wirelessly encrypts and sends the debit PIN information along with the user sensitive information from the card (i.e., account number, etc.), again without storing and without displaying for enhanced security (Block 46').

In particular, storing of the user sensitive data and/or debit PIN information may be avoided by using a Secure Sockets Layer (SSL) protocol for communications between the processor 28 and the transaction card issuing entity 34. As shown in the illustrated embodiment, the communications between the processor 28 and the transaction card issuing entity 34 are over the Internet 36. In some embodiments, each processor 28 may also communicate with an inventory server 35 via the Internet, which may advantageously maintain inventory for one or more stores, restaurants, etc., as orders are taken and processed.

The inventory server 35 may also be used to provide accounting services for the given store, restaurant, etc. Another advantageous use for the inventory server 35 is that it may be used to provide software, menu, or other updates to the portable handheld devices 21a-21n via the Internet 36 to be stored in the non-volatile memory 33. Of course, updates to red data stored in the volatile memory 32 may potentially be updated in this fashion as well, if desired, as will be appreciated by those skilled in the art. The portable handheld device may further include a printer 37 carried by the housing 22 in some embodiments. The processor 28 may thereby print a transaction receipt for a customer, at Block 60'.

Figure 10:
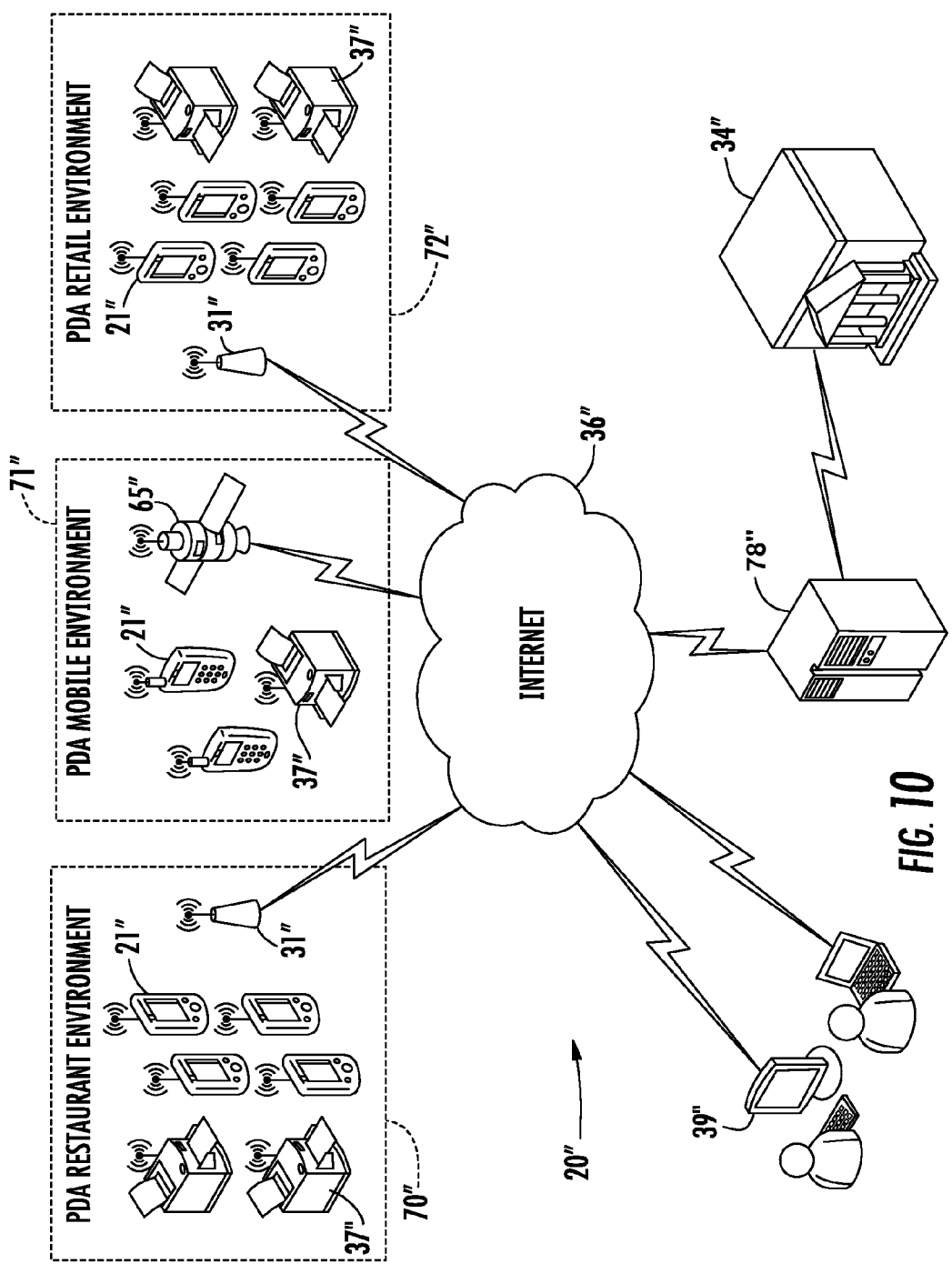
FIG. 10 is a schematic block diagram of an alternative embodiment of the system of FIG. 1.

An alternative arrangement of the system 20" providing a secure wireless internet payment environment (SWIPE) is now discussed with reference to FIG. 10. Generally speaking, certain core functions of the system 20" include order entry and payment acceptance abilities. The portable handheld devices 21" allow order entry functionality and payment acceptance by reading information from a coupled magnetic card reader 25, and orders and payment information are transmitted wirelessly to a secured server 78". Credit card and debit PIN requests are captured using an encrypted interface which sends payment information using encryption and approved industry standards. Each individual device 21 is used to place orders and may be presented to the customer to initiate final payment.

More particular, the SWIPE is a wireless electronic dual order entry/POS system. The portable electronic device 21" may collect information using touch screen technology, and the coupled card reader 25" captures credit and debit PIN information, which is encrypted and transmitted to a card issuing bank 34" using a secured wireless connection (e.g., and SSL connection). Hardware components are protected to reduce the likelihood of tampering and or accessing internal components of the device 21". The cardholder's credit card, debit PIN and/or gift card information is encrypted into a secured file packet and transmitted using a real time authorization process transmitting data direct to issuing bank 34" including, for example, VISA, MasterCard, JCB (Japanese Credit Bureau) and local PIN debit networks.

The portable handheld device 21" preferably does not have the ability to store or display credit card or debit PIN information on the physical device, nor to store any sensitive information in the internal memory or buffers of the input device. The cardholder will advantageously have the ability to initiate the payment process using a series of screens which transmits data to issuing bank 34" and verifies a completed transaction, allowing the customer to protect personal card information to reduce skimming violability, the central component in identity theft.

As noted above, an SSL protocol may be used to provide secured data transmission to the issuing bank 34" so that the portable handheld devices 21" do not have to store, display or posses the ability to otherwise output sensitive data. Moreover, the portable handheld devices 21" and wireless network routers 31" are the only components required to transmit data, and thus a server need not be kept at a store or restaurant premises with sensitive information stored thereon. All prompts are protected against penetrations, modifications and alterations, and the portable handheld device 21" may also include a printer 37" for printing receipts generated as a result of a sale transaction. The printers 37" may be coupled to respective devices 21, or physically detached therefrom as shown in FIG. 10 and communicate wirelessly therewith. In this way, the printers 37" may be shared between multiple devices 21", if desired.

The system 20" and, more particularly, the portable handheld device 21" may advantageously be used for restaurant/hospitality, mobile and retail environments, for example, having a total weight and outer dimensions permitting a person to relatively easily carry it in hand while inputting and transmitting data. In the illustrated embodiment, a PDA restaurant environment 70" includes physically and logically secured portable handheld devices 21" communicating using secured wireless communication capabilities to connect to receipt and service printers, secured SSL two-way communications to the server 78" via the Internet 36", processor and issuing banks 34", as well as backend management and reporting systems 39", as will be appreciated by those skilled in the art.

A PDA mobile environment 71" also illustratively includes physically and logically secured portable devices 21" communicating using secured wireless communication capabilities (e.g., satellite 65" communication links) to connect to receipt and service printers 37", secured SSL two-way communications to the server 78", processor and issuing banks 34", as well as the backend management and reporting systems 39". Additionally, a PDA retail environment 72" illustratively includes physically and logically secured portable devices 21" communicating using secured wireless communication capabilities to connect to receipt and service printers 37", secured SSL two-way communications to the server 78", processor and issuing banks 34", and backend management and reporting systems 39, as discussed above.

Further operational aspects and advantages will be understood with reference to another exemplary SWIPE implementation. Preferably, all SWIPE applications are supported by the Windows CE operating systems (OS): ASP.NET, Windows .NET Web Services, WEP Encryption, Microsoft .Net Compact Framework, and SSL Encryption. Utilizing the Microsoft .NET Compact Framework application on a PDA provides secure communication over a wireless network, which communicates over the wired internet using SSL encryption, retrieving data from a Microsoft .NET Web service.

Microsoft® Windows® CE is an open, scalable, 32-bit operating system that is designed to meet the needs of a broad range of intelligent devices, from enterprise tools such as industrial controllers, communications hubs, and point-of-sale terminals to consumer products such as cameras, telephones, and home entertainment devices. A typical Windows CE-based embedded system targets a specific use, runs disconnected from other computers, and requires an operating system that has a small footprint and a built-in deterministic response to interrupts.

The .NET Framework has two main components, namely the common language runtime and the .NET Framework class library. The class library is a comprehensive, object-oriented collection of reusable types of applications ranging from traditional command-line or graphical user interface (GUI) applications to applications based on the latest innovations provided by ASP.NET, such as Web Forms and XML Web services. The .NET Framework can be hosted by unmanaged components that load the common language runtime into their processes and initiate the execution of managed code, thereby creating a software environment that can exploit both managed and unmanaged features.

SSL is a widely used method for transmitting encrypted data over the Internet. SSL uses public key cryptography to securely generate and exchange a secret key called the session key. The Microsoft® Windows® CE-based client and Microsoft Internet Information Services (IIS) use the session key to encrypt and decrypt the data they send to one another. Connectivity between Microsoft® SQL Server™ 2000 Windows® CE Edition (SQL Server CE) and an instance of Microsoft SQL Server relies entirely upon properly configuring the security models for both the Microsoft Internet Information Services (IIS) and SQL Server. In the SQL Server CE connectivity scenario, a Windows CE-based application initiates synchronization by invoking the appropriate SQL Server CE connectivity solution, either replication or remote data access (RDA). After the SQL Server CE Server Agent is invoked, it connects to an instance of SQL Server. SQL Server authentication and authorization can be configured to control access to SQL Server or SQL Server publications.

IEEE 802.11 is a set of industry standards for shared wireless local area network (WLAN) technologies, the most prevalent of which is IEEE 802.11b, also known as Wi-Fi. IEEE 802.11b transmits data at 1, 2, 5.5 or 11 Megabits per second (Mbps) using the 2.45 gigahertz (GHz) S-Band Industrial, Scientific, and Medical (ISM) frequency range. The latest implementation of the standard, 802.11g, transmits data at speeds of up to 54 Mbps. Other wireless devices such as microwave ovens, cordless phones, wireless video cameras, and devices using another wireless technology known as Bluetooth also use the S-Band ISM. Security for IEEE 802.11 includes encryption and authentication. Encryption is used to encrypt, or scramble, the data in wireless frames before they are sent on the wireless network. Authentication requires wireless clients to authenticate themselves before they are allowed to join the wireless network.

Secured gateways utilize SSL authentication and encryption technology. This is patented technology developed by Netscape Communications and relies on encryption developed by RSA Data Security, Inc. and other cryptographic providers. SSL encryption protects information being transmitted across the Internet from third parties. When remote web browsers are accessed by the Gateway Commerce Server, the connection between the "client" and Commerce Server becomes a dedicated "link." This is done by the exchange of keys between a commerce server and the "client," which each use the keys for encrypting and decrypting the data which is passed between the connection. Transmitting information is encrypted and would appear as jumbled or mangled text across the Internet to the Gateway Commerce Server where the data is decrypted on a secure connection with a server, which uses SSL technology.

A debit PIN user input device may include a Graphical User Interface (GUI) with a plurality of keys (e.g., 13 or more keys) and entry display. The display may show text prompts to guide user through steps required. PIN entry will result in the display of a non-descriptive character per key pressed, and preferably no key identifying sounds will occur during PIN entry. When a PIN has been entered and the ENTER key has been selected, the application will format and encrypt the entered PIN information using encryption information stored securely in the portable handheld device. User Track 2 data from the credit or debit card will be present and provided to the encrypting application for use in formatting the PIN-BLOCK data prior to the entry of PIN information. Following the encryption process, all memory used for the encryption is preferably immediately zeroed or cleared. Derivation of encryption data will be performed just prior to each encryption process so that no clear text encryption data is stored between uses.

Certain existing prior art wireless certified solutions will now be described. The first is analog systems. These systems include machines that use wireless data networks. This service offers virtually universal coverage. However, various types of "roaming charges" from a cellular phone through a connecting "magic box" interface, can add up very quickly. Plus, the processing units tend to be a bit cumbersome, as they include a terminal (plus its charger), a phone (plus charger), and its connecting interface. Moreover, desired coverage is not always available with analog systems.

Radio and Cellular Digital Packet Data (CDPD) are similar in that there is no traditional roaming charge from a cellular company, but as with analog system coverage varies. Still, various processing companies typically charge a fixed monthly subscription fee in order to use either service. A main advantage of machines that use these technologies is that they are "all-in-one" units. CDPD and radio devices provide coverage virtually anywhere, but each of these two technologies have coverage gaps. CDPD reportedly works better from indoor settings, due to the frequency range of its radio signal, but it is purportedly lacking coverage in some major cities. Also, it is possible that a CDPD carrier may not be licensed to operate in every market that has CDPD coverage.

It is predicted that by the year 2007 there will be nearly 120,000 WLAN "hot spot" gateways world-wide, providing access to private and public networks from over 200 million mobile devices being used for business. Furthermore, 85% of wireless security incidents will involve data at rest on the selected devices. In comparison CDPD and radio technology have not provided secured multi-purpose functionality, CDPD and radio are limited to the precautions taken by the service provider. SWIPE enhances the security boundary and the benefits of secured Card Verification Value (CVV2) Internet processing and decreases fraud by ensuring that the cardholder never looses sight of their card.

In recent years, the industry has witnessed significant growth in skimming and counterfeit fraud with the development of small, portable devices, which can store up to 100 account numbers at a time. Once in possession of a customer's credit card, the criminal can run the card through this easily concealed device and in seconds access and store the magnetic stripe information. Skimming usually occurs in businesses where the normal transaction requires the cardholder to give up possession of the card, such as in restaurants.

To date the payment card industry and relevant government agencies have been addressing the issue from a largely independent position. The SWIPE solution may be a more effective tool by decreasing the opportunity for these types of fraud to occur. Skimming and counterfeit fraud are much more difficult when the cardholder is in possession of his credit card. SWIPE mitigates the opportunity of a criminal gaining access to an individual's credit card account. More importantly, the combined solution represents a real time high level of risk management defense through its multiple secured data sources.

VISA PIN entry device certification when granted is provided by VISA to ensure PIN entry device (PED) PIN physical and logical security characteristics. Cardholder PIN confidentiality depends on adequate PIN security standards and their secure implementation. Therefore, international standards organizations (ANSI and ISO) require migration from the Data Encryption Standard (DES) using single-length keys (Single DES) to the Triple DES algorithm (TDES), of which the TDES key length are at least double-length. VISA adheres to international standards and requires that all newly deployed PIN entry devices support the use of Triple DES whenever DES is used to protect the cardholder's PIN, e.g., online PINs.

The VISA PED Identifier represents the PED model that has been evaluated successfully by the laboratory and received Visa's approval. The identifier consists of the following four (4) components: PED model name and/or number, hardware version number, firmware version number, and application version number. VISA will issue approval letters to manufacturers with PEDs that have successfully passed a laboratory evaluation to ensure compliance with VISA and industry standards and specifications.

In the SWIPE system, a PDA is used for the portable handheld device. All logic may reside on a secured Internet server providing encrypted real-time transactions. Building on familiar platforms, SWIPE offers numerous payment and value-added options simultaneously. It provides a multi-functional authentication solution that will verify swiped transactions with the security of the Internet in a real-time POS payment environment. With SWIPE, faster transaction times may be achieved, as well as increased revenues resulting from increased spending per transaction and increased frequency of purchases and increased loyalty. Improved operational efficiency results from reducing overhead and recourses. Competitive differentiation attracts new customers by providing a more convenient payment method.

Various SWIPE Modules may be implemented for different applications. A SWIPE Interface supports operating utility allowing all SWIPE programs to interface with one another. For example, a SWIPE Hospitality program may store and transfer information to either the credit or debit card payment programs. File data storage and transfer include all food and services ordered. It also supports programs such as pinging to kitchen and bar area, signature capture on screen, debit encryption storage/transfers and pinging features on the device.

The SWIPE Hospitality module provides a complete customized menu program which can be modified to manage different restaurant or hospitality needs. Each menu is stored on a secured web site which allows the housing, storing, and transfer of order entry data for several customers at once. The utility is also communicates using a SQL protocol supported by the SWIPE Interface. A SWIPE credit module provides credit/offline debit authorization/settlement payment utility capturing all track data on the payment card including CVV2. Transactions are captured via POS swiping and processed in a real time environment via a secured Internet gateway. Virtual transactions offer faster settlement and payment to a merchant's account.

A SWIPE PIN module provides online debit PIN authorization/settlement payment utility using 3DES, DUKPT and PIN Block functionality using the SWIPE interface connection port. Transactions are processed through a virtual gateway. Customers can swipe their own check/debit cards including personal PIN to certified debit networks in a real time environment. Moreover, a SWIPE Gift module allows merchants to load and deduct payments to provide a total integrated solution. A SWIPE Menu module is a custom configuration opened utility, which can be built to manage various types of inventory and data. Using the SWIPE Interface input data can be transferred for processing or storage and viewed using Internet back end management programs.

Retail/restaurant benefits of using the SWIPE system include speed and security of payment, for example. More particularly, industry segments in which speed and security of payment are essential can realize significant benefits from SWIPE include restaurants (especially fine dining establishments); parking facilities, entertainment venues and amusement parks. While business drivers differ for each segment, early tests of SWIPE have demonstrated the one or more of the following benefits may be achieved: faster transaction times; increased revenue; improved operational efficiency and lower operating cost; better customer information; and/or competitive differentiation. More particularly, faster transactions times are achieved by moving to a real-time payment gateway that is faster than such telecom transactions. It is estimated that SWIPE credit or debit can save 10-15 seconds per transaction with respect to such transactions. In some retail segments, faster customer service may translate directly into increased revenue. Increased revenue may result from increased spending per transaction, increased frequency of purchases, and increased loyalty (when the merchant becomes the customer's preferred retailer). Swiping his or her own card gives the customer a more secured payment option.

Improved operational efficiency and lower operating costs may result from reducing overhead and recourse requirements at merchant locations, reducing card handling and pilferage cost, and improving reliability of payment solution. Better customer information enables the retailer to better understand customers' behavior by collecting data that could not be collected with traditional telecom terminal devices. Competitive differentiation attracts new customers by providing a more secured, convenient, multi-functional payment method.

SWIPE technology can support numerous payment requests, including traditional credit card, debit PIN, pre-authorization and gift or stored value payment solutions. Credit and debit transactions require the participation of one or more financial institutions and the approval of a payment association. In North America, the three major card associations (American Express, MasterCard and VISA) have established Internet payment options with significant issuer participation. The stronger security of processing on the Internet could help drive increased sales and telecom processing can be eliminated as a practical processing alternative to a wireless real time transaction solution.

The SWIPE solution may operate at 82 dBm @11 Mbps across a distance of up to 100 feet or more from a router, for example. The technology will allow programmed data to be transferred between the server and the POS device, such as restaurant menus, closed ticket orders, credit card, and debit and gift card transactions. SWIPE also communicates, stores and transmits data. The technology eliminates the need for the server to walk away with the customer's credit or debit card to authorize payments, which has been the most widely used method of gaining the cardholders information for skimming. SWIPE technology introduces additional points between the authorization/settlement interface and the POS terminal.

Another advantageous implementation of a SWIPE PED is now described. In this implementation, the SWIPE PED comprises an off-the-shelf HP iPAQ hx4700 Pocket PC handheld PDA-style device. A magnetic stripe card reader is connected to the device via the compact flash slot at the top of the PED. The PED runs Microsoft Windows CE 4.21 Pocket PC OS. Special software from iAnywhere called Afaria provides the vendor (SecuredPay in the present example) the ability to remove unwanted software applications, operating system user interfaces, and lock the device interface and ports. The PIN entry functionality is provided by SecuredPay software loaded on the device. SecuredPay configures the device, loads the requisite menus and transaction firmware, then performs a system lockdown with the Afaria software before the device leaves SecuredPay's premises. No other software can be loaded or changes made to the device once it is locked without performing a hard reset, which erases all vendor firmware and sensitive information, including keys.

Physical protection is provided by an epoxy potting process that is applied to the device after it is received from HP. A custom epoxy potting compound from System Three is used to fill most voids inside the device. The case and main battery are removed. A number of interior stickers and plastic covers are removed to allow for direct adhesion between components. The epoxy is applied using a syringe to the interior of the device, including between the LCD and the main PCB, around the front case, covering the touch screen data path, covering the display output, between the main battery and PCB, and in the rear of the case. All sensitive components and data paths are covered in this potting compound.

The device case includes five main parts: (1) front case and bezel with opening for the touch screen display; (2) rear case with the space for the main battery; (3) a black plastic frame that extends on three sides of the device and is exposed on the two sides and top; (4) main battery exposed on the rear of the device; and (5) a second black plastic piece with buttons and touch sensor on the bottom front the device. The PDA is designed to be held together with four screws that are inserted from the back and extend through the back, main PCB, large black plastic frame, and attach to the front case. Other plastic tabs also provide some assistance in keeping the device together. During the epoxy potting process, all of the case parts are secured together with the epoxy and the screws are dipped in the epoxy before being inserted. The top of the screw hole is then filled with epoxy flush with the rear case.

Once the device has been potted and reassembled, the epoxy is heat cured. The epoxy protection ensures any attempt to gain access to the interior of the device to disclose future PINs in any way will result in the destruction of the device or at a minimum leave tamper evidence that would have a high probability of detection. The epoxy potting compound used to fill the interior of the device provides a strong protection preventing internal access with the intent of disclosing future PINs. This advantageously provides a relatively high degree of protection against mechanical, chemical, and temperature methods for defeating the potting material that would otherwise allow an attacker to penetrate and alter the PED to disclose future PINs without damaging the device or causing tamper evidence that a cardholder would recognize.

Sensitive information handled by the PED takes the form of plaintext PIN values, prompt messages for numeric input, and cryptographic keys. Once keys and firmware, including prompt data, are entered into the PED, there is no mechanism to output these. PIN values are never output in plaintext form, only encrypted. Within the PED, they are stored and processed by circuitry within the potting securing the device. This data is fully contained within the PED. All sensitive information and firmware is stored and processed within components that are protected by the epoxy potting that secures the device components and case. All sensitive information and firmware are stored and processed within BGA mounted components within a very small area of the PCB. Very few traces between the processor, RAM, FLASH, and the display controller are accessible even if the epoxy was defeated.

All prompts used in conjunction with non-PIN data entry are integrated into the firmware of the PED. This firmware is loaded once at manufacture and cannot be updated or modified without performing a hard reset of the device which erases all sensitive information and firmware. The firmware does include a function to update the restaurant menu offerings by connecting to a remote server. A separate XML file containing these items is downloaded onto the device. None of these prompts are used in conjunction with non-PIN data input, as the menu system only allows a server to increment or decrement the quantity of items with "+" and "−" buttons. The XML schema does not allow for any items other than menu entries to be defined or processed by the PED. This update service does not impact the security of any sensitive information.

All prompts are stored within the physically secured area of the FED. There are no access points to the program storage area, the processor, or any intervening paths. Moreover, when a user enters a debit PIN each digit provides a same tone, that is, each PIN digit uses the same sound. The tones are generated by the iPAQ sound card, which is capable of playing any tones, and is driven from the main power supply of the PED. The device is designed to conform with appropriate FCC, ANSI, and IEEE limits for intentional radiated power output on the wireless interfaces and spurious emissions.

The PED is a standard size PDA, and cardholder PIN values are entered into the device through the main touch screen interface. This allows a cardholder to shield the display during PIN entry. The PED is an HP iPAQ PDA device custom designed and manufactured for HP. The card reader interface is designed and manufactured by SemTek Innovative Solutions Corporation. The casings are not commercially available, making the construction of a duplicate device from commonly available components impractical and providing still further security.

Self-tests are performed on power up and periodically. The self-tests include a firmware integrity check (SHA256 hash) of all of the firmware components including SecuredPay.exe PIN pad and encryption program; Afaria program used to lock the device, SWIPE menu and order processing program, SIVA firmware integrity check and scheduling software, and selected Windows Mobile 2003 libraries used by the above-noted software. The firmware integrity test is run initially on boot by the SIVA application. Subsequent tests are performed periodically triggered by the SIVA scheduler every 24 hours, for example, or as otherwise specified. In the event of a firmware integrity check failure, the SIVA application will prevent the execution of the firmware and the user will be denied access through the user interface.

The PED performs a self-test upon start-up and at least once per day to check firmware, security mechanisms for signs of tampering, and whether the PED is in a compromised state. In the event of a failure, the PED and it functionality fails in a secure manner. The firmware tests occur automatically and must successfully pass in order to launch the application. A failure will result in a message being displayed indicating that the device has been deactivated and all sensitive information has been erased.

The device has multiple input/output interfaces USB, Compact Flash, SD card, 802.11b wireless, and the touch screen. After firmware load at SecuredPay, the Afaria software disables the USB port for the remainder of the PED lifecycle. The touch screen is used to perform the one time initial key load. No sensitive services or functions are available over the other interfaces. Data passed to the card processor is checked for proper parameter values.

All PED firmware undergoes a documented process that is applied to all new releases and updates. Before each release, the source code is reviewed. Firmware is developed using software source code control, specifically Microsoft Visual SourceSafe. The PED displays the firmware version number within the SwipeMenu Settings screen.

Asterisks or other similar symbols are displayed on the PED in lieu of entered PIN digits. The PED is designed to operate in a restaurant setting where the wait staff will use the device to record the orders of the clients directly in the PED. Order totals are calculated by the application and the cardholder is prompted to enter a tip amount based on the order subtotal. Once the tip screen has been completed within the application, control of the device is turned over to the firmware component responsible for displaying the PIN pad and calculating the encrypted PIN block. The separation between the application and firmware ensures that the PIN entry is clearly a separate operation from the menu and tip amount entries.

Sensitive PIN data temporarily resides in buffers within the PED. The SWIPE application erases the buffers at the completion of the PIN block encryption, if the transaction is canceled, or the PIN entry times out. The following data is cleared from the internal buffers of the PED: PIN data; intermediary calculation data; and clear text PIN block. The PIN entry screen times out in 3 minutes (or other predetermined period) and returns to the menu software, although other timeout durations may also be used.

The only sensitive function or service is a one time TDES DUKPT initial key load. Firmware updates are performed by SecuredPay and require a hard reset of the device which clears all SecuredPay firmware and sensitive information, including cryptographic keys. The restaurant menu update function is not considered to be security relevant. Key loading can be performed after firmware has been loaded by SecuredPay. A screen exists that will allow for the TDES DUKPT initial key and KSN to be entered. The TDES DUKPT initial key must be entered as two separate components. This key loading requires two separate key components to be entered along with separate passwords associated with each. Key component and password fields are masked and each component holder enters his key component and password exactly the same twice for verification. If the two passwords have been entered correctly, the device will perform the sensitive function combining the two components together, saving the resulting key, and immediately return a message displaying a successful key load.

Once loaded, the key input screen is disabled and further attempts to access it display a message that the key has been successfully loaded and the key load request is aborted. A hard reset, which erases all SecuredPay firmware and PIN encryption keys, is the only way to reload any keys. Passwords and key share values are not displayed during entry and are immediately erased from internal buffers after use.

The sensitive one time key loading function is the only sensitive state present in the device. The first individual enters their masked TDES DUKPT initial key component and their masked password into the Part 1 key loading screen. No sensitive data or functions are available or processed until the Complete KeyPart 1 button is touched. At this time the firmware resumes control, verifying the first password and caching the first key component. The second individual is then prompted to enter their masked TDES DUKPT initial key component and their masked password into the Part 2 key loading screen. No sensitive data or functions are available or processed until the Complete KeyPart 2 button is touched. At no point is the device in a sensitive state waiting for any input or commands.

The PED processes the PIN as follows. The PED menu application finalizes the transaction amount and gathers the account information from the magnetic card reader. This information is then passed to the PIN pad application. The PIN pad application then displays a PIN pad on the touch screen, and the cardholder enters the PIN and touches the Enter button. The PIN pad application immediately calculates the PIN block, encrypts it, and returns it to the menu application.

The PED has characteristics that prevent or significantly deter the use of a stolen device for exhaustive PIN determination (e.g., using electromechanical solenoids to depress the keys, so as to try all possible PINs until the ciphertext produced equals the ciphertext recorded when the PED was in operational use). For example, the device uses a unique key per transaction technique (i.e., prevents the attack). Moreover, the device prevents the entry of the PIN through methods other than the keypad, and limits the rate at which the PED will encrypt PINs to the average (e.g., over 120 transactions) of one per 30 seconds (i.e., deters the attack).

The PED implements the DUKPT key management technique as defined by ANSI X9.24 and utilizes Triple-DES encryption in compliance with ISO 9564. The PIN block format is consistent with ISO 9564-1 Format 0. PIN encryption keys are managed by the device firmware and cannot be exported from the device. Only a single set of future DUKPT keys exist in the device and only a single application uses this set. As noted above, firmware and application updates are not possible without hard resetting the device, causing all firmware and keys to be lost. The device has no keys for firmware or application updates. As also discussed above, the 3DES DUKPT PIN encryption key is loaded via two separate key components held by two individuals. The device does not allow a plaintext single component key to be entered manually or electronically. The device does not use any public key techniques for distribution of symmetric secret keys.

There are preferably no mechanisms in the device that will permit the output of a private or secret cleartext key or PIN. Moreover, there are also preferably no commands available through the user interface or USB port to output keys or PIN values. The PIN values are encrypted immediately upon entry and are erased after they are used to form the PIN block. PIN values are only output as part of an encrypted PIN block. No functionality is provided to read out keys or PINs in plaintext or encrypted under keys that themselves might be disclosed. There is only a single set of TOES DUKPT keys used exclusively for PIN encryption.

As noted above, all sensitive information is stored and used within the PED housing potted in epoxy. The processor, memory, and storage all have an equal level of physical protection. The device hardware and software do not provide any mechanisms to output cleartext keys outside of the physically secured area.

The PED and the ICC reader, whether integrated or not, are designed to be used as unattended devices (e.g., fuel dispenser, vending machine, etc) and are tamper responsive, including precautions against unauthorized removal. If the PED and the ICC reader are not integrated and the cardholder verification method (i.e., the ICC requires) is determined to be an enciphered PIN, then the PIN block is be enciphered between the PED and the ICC reader using either an authenticated encipherment key of the ICC, or in accordance with ISO 9564-1. If the PED and the ICC reader are integrated and the cardholder verification method is determined to be an enciphered PIN, then the PIN block is enciphered using an authenticated encipherment key of the ICC. Additionally, if the PED and ICC reader are integrated and the cardholder verification method is determined to be a plaintext PIN, then encipherment is not required if the PIN block is transmitted wholly through a protected environment (as defined in ISO 9564.1 Section 6.3). If the plaintext PIN is transmitted to the ICC reader through an unprotected environment, then the PIN block is enciphered in accordance with ISO 9564-1.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A portable device for real time authorization comprising:
   a housing;
   an output device carried by said housing;
   an input device carried by said housing for obtaining user sensitive information;
   a wireless transceiver carried by said housing; and
   a processor carried by said housing and coupled to said output device, input device, and wireless transceiver for
      wirelessly sending the user sensitive information via said wireless transceiver and without retrievably storing the user sensitive information, and
      wirelessly receiving authorization information via said wireless transceiver based upon real time authorization related to the user sensitive information and generating an output related to the received authorization information via said output device.

2. The portable device of claim 1 further comprising a personal identification number (PIN) input device carried by said housing and coupled to said processor; and wherein said processor also wirelessly sends PIN information without retrievably storing the PIN information.

3. The portable device of claim 2 wherein said output device comprises a display; and wherein said processor also wirelessly sends the user sensitive information and the PIN information without displaying the user sensitive information and the PIN information on said display.

4. The portable device of claim 1 further comprising a debit personal identification number (PIN) input device carried by said housing and coupled to said processor; and wherein said processor also wirelessly sends debit PIN information without retrievably storing the debit PIN information.

5. The portable device of claim 1 wherein said input device comprises a transaction device reader.

6. The portable device of claim 1 wherein said wireless transceiver comprises a wireless local area network (WLAN) transceiver.

7. The portable device of claim 1 wherein said wireless transceiver comprises a cellular telephone transceiver.

8. The portable device of claim 1 wherein said wireless transceiver comprises a wireless Bluetooth transceiver.

9. The portable device of claim 1 wherein said wireless transceiver comprises a radio transceiver.

10. The portable device of claim 1 wherein said processor cooperates with said wireless transceiver to use encryption.

11. The portable device of claim 10 further comprising a volatile memory coupled to said processor and storing a private key for the encryption.

12. The portable device of claim 11 further comprising at least one tamper resistant structure associated with said volatile memory.

13. The portable device of claim 1 wherein said processor sends and receives information via a Secure Sockets Layer (SSL) protocol.

14. The portable device of claim 1 further comprising an order entry input device carried by said housing and coupled to said processor.

15. The portable device of claim 14 wherein said order entry input device comprises a touch screen display.

16. The portable device of claim 1 wherein said input device comprises a touch screen display.

17. The portable device of claim 1 further comprising a memory coupled to said processor for storing restaurant menu data.

18. The portable device of claim 1 wherein said output device comprises a printer.

19. The portable device of claim 1 wherein said output device comprises a screen display.

20. The portable device of claim 1 wherein said output device comprises a touch screen display.

21. The portable device of claim 1 wherein the user sensitive information comprises a personal identification number (PIN).

22. The portable device of claim 1 wherein the user sensitive information comprises a password.

23. The portable device of claim 1 wherein said input device comprises a keypad.

24. A device for real time authorization comprising:
   an output device;
   an input device for obtaining user sensitive information;
   a wireless transceiver; and
   a processor coupled to said output device, input device, and wireless transceiver for
      wirelessly sending the user sensitive information via said wireless transceiver and without retrievably storing the user sensitive information, and
      wirelessly receiving authorization information via said wireless transceiver based upon real time authorization related to the user sensitive information and generating an output related to the received authorization information via said output device.

25. The device of claim 24 further comprising a personal identification number (PIN) input device coupled to said processor; and wherein said processor also wirelessly sends PIN information without retrievably storing the PIN information.

26. The device of claim 25 wherein said output device comprises a display; and wherein said processor also wirelessly sends the user sensitive information and the PIN information without displaying the user sensitive information and the PIN information on said display.

27. The device of claim 24 further comprising a debit personal identification number (PIN) input device coupled to said processor; and wherein said processor also wirelessly sends debit PIN information without retrievably storing the debit PIN information.

28. The device of claim 24 wherein said input device comprises a transaction device reader.

29. The device of claim 24 wherein said wireless transceiver comprises a wireless local area network (WLAN) transceiver.

30. The device of claim 24 wherein said wireless transceiver comprises a cellular telephone transceiver.

31. The device of claim 24 wherein said wireless transceiver comprises a wireless Bluetooth transceiver.

32. The device of claim 24 wherein said wireless transceiver comprises a radio transceiver.

33. The device of claim 24 wherein said processor cooperates with said wireless transceiver to use encryption.

34. The device of claim 33 further comprising a volatile memory coupled to said processor and storing a private key for the encryption.

35. The device of claim 34 further comprising at least one tamper resistant structure associated with said volatile memory.

36. The device of claim 24 wherein said processor sends and receives information via a Secure Sockets Layer (SSL) protocol.

37. The device of claim 24 further comprising an order entry input device coupled to said processor.

38. The device of claim 37 wherein said order entry input device comprises a touch screen display.

39. The device of claim 24 wherein said input device comprises a touch screen display.

40. The device of claim 24 further comprising a memory coupled to said processor for storing restaurant menu data.

41. The device of claim 24 wherein said output device comprises a printer.

42. The device of claim 24 wherein said output device comprises a screen display.

43. The device of claim 24 wherein said output device comprises a touch screen display.

44. The device of claim 24 wherein the user sensitive information comprises a personal identification number (PIN).

45. The device of claim 24 wherein the user sensitive information comprises a password.

46. The device of claim 24 wherein said input device comprises a keypad.

47. A device for real time authorization comprising:
an output device;
an input device for obtaining user sensitive information;
a personal identification number (PIN) input device;
a wireless transceiver; and
a processor coupled to said output device, input device, PIN input device, and wireless transceiver for encrypting and wirelessly sending the user sensitive information and PIN information via said wireless transceiver and without retrievably storing the user sensitive information and the PIN information, and
wirelessly receiving authorization information via said wireless transceiver based upon real time authorization related to the user sensitive information and PIN information, and generating an output related to the received authorization information via said output device.

48. The device of claim 47 wherein said output device comprises a display; and wherein said processor also wirelessly sends the user sensitive information and PIN information without displaying the user sensitive information and PIN information on said display.

49. The device of claim 47 wherein said input device comprises a transaction device reader.

50. The device of claim 47 wherein said wireless transceiver comprises a wireless local area network (WLAN) transceiver.

51. The device of claim 47 wherein said wireless transceiver comprises a cellular telephone transceiver.

52. The device of claim 47 wherein said wireless transceiver comprises a wireless Bluetooth transceiver.

53. The device of claim 47 wherein said wireless transceiver comprises a radio transceiver.

54. The device of claim 47 wherein said processor cooperates with said wireless transceiver to use encryption.

55. The device of claim 54 further comprising a volatile memory coupled to said processor and storing a private key for the encryption.

56. The device of claim 55 further comprising at least one tamper resistant structure associated with said volatile memory.

57. The device of claim 47 wherein said processor sends and receives information via a Secure Sockets Layer (SSL) protocol.

58. The device of claim 47 further comprising an order entry input device coupled to said processor.

59. The device of claim 58 wherein said order entry input device comprises a touch screen display.

60. The device of claim 47 wherein said input device comprises a touch screen display.

61. The device of claim 47 further comprising a memory coupled to said processor for storing restaurant menu data.

62. The device of claim 47 wherein said output device comprises a printer.

63. The device of claim 47 wherein said output device comprises a screen display.

64. The device of claim 47 wherein said output device comprises a touch screen display.

65. The device of claim 47 wherein the user sensitive information comprises a password.

66. The device of claim 47 wherein said input device comprises a keypad.

67. A system for wireless order entry and real time authorization via the Internet and comprising:
a wireless network router coupled to the Internet; and
at least one device comprising
an output device,
an input device for obtaining user sensitive information,
a wireless transceiver, and
a processor coupled to said output device, input device, and wireless transceiver for
wirelessly sending the user sensitive information to said wireless network router via said wireless transceiver and without retrievably storing the user sensitive information, and wirelessly receiving authorization information related to the user sensitive information from said wireless network router via said wireless transceiver based upon real time authorization, and generating an output related to the received authorization information via said output device.

68. The system of claim 67 further comprising a personal identification number (PIN) input device coupled to said processor; and wherein said processor also wirelessly sends PIN information without retrievably storing the PIN information.

69. The system of claim 68 wherein said output device comprises a display; and wherein said processor also wirelessly sends the user sensitive information and the PIN information without displaying the user sensitive information and the PIN information on said display.

70. The system of claim 67 further comprising a debit personal identification number (PIN) input device coupled to said processor; and wherein said processor also wirelessly sends debit PIN information without retrievably storing the debit PIN information.

71. The system of claim 67 wherein said input device comprises a transaction device reader.

72. The system of claim 67 wherein said wireless transceiver comprises a wireless local area network (WLAN) transceiver.

73. The system of claim 67 wherein said wireless transceiver comprises a cellular telephone transceiver.

74. The system of claim 67 wherein said wireless transceiver comprises a wireless Bluetooth transceiver.

75. The system of claim 67 wherein said wireless transceiver comprises a radio transceiver.

76. The system of claim 67 wherein said processor cooperates with said wireless transceiver to use encryption.

77. The system of claim 76 further comprising a volatile memory coupled to said processor and storing a private key for the encryption.

78. The system of claim 77 further comprising at least one tamper resistant structure associated with said volatile memory.

79. The system of claim 67 wherein said processor sends and receives information via a Secure Sockets Layer (SSL) protocol.

80. The system of claim 67 further comprising an order entry input device coupled to said processor.

81. The system of claim 80 wherein said order entry input device comprises a touch screen display.

82. The system of claim 67 wherein said input device comprises a touch screen display.

83. The system of claim 67 further comprising a memory coupled to said processor for storing restaurant menu data.

84. The system of claim 67 wherein said output device comprises a printer.

85. The system of claim 67 wherein said output device comprises a screen display.

86. The system of claim 67 wherein said output device comprises a touch screen display.

87. The system of claim 67 wherein the user sensitive information comprises a personal identification number (PIN).

88. The system of claim 67 wherein the user sensitive information comprises a password.

89. The system of claim 67 wherein said input device comprises a keypad.

90. A wireless real time authorization method comprising:
obtaining user sensitive information from an input device;
wirelessly sending the user sensitive information via a wireless transceiver and without retrievably storing the user sensitive information; and
wirelessly receiving authorization information related to the user sensitive information via the wireless transceiver based upon real time authorization and generating an output related to the received authorization information via an output device.

91. The method of claim 90 wherein wirelessly sending also comprises wirelessly sending personal identification number (PIN) information obtained from a PIN input device and without retrievably storing the PIN information.

92. The method of claim 91 wherein wirelessly sending also comprises wirelessly sending the user sensitive information and the PIN information without displaying the user sensitive information and the PIN information on a display.

93. The method of claim 90 wherein wirelessly sending also comprises wirelessly sending debit personal identification number (PIN) information obtained from a debit PIN input device and without retrievably storing the debit PIN information.

94. The method of claim 90 wherein the input device comprises a transaction device reader.

95. The method of claim 90 wherein the wireless transceiver comprises a wireless local area network (WLAN) transceiver.

96. The method of claim 90 wherein the wireless transceiver comprises a cellular telephone transceiver.

97. The method of claim 90 wherein the wireless transceiver comprises a wireless Bluetooth transceiver.

98. The method of claim 90 wherein the wireless transceiver comprises a radio transmitter.

99. The method of claim 90 wherein wirelessly sending comprises wirelessly sending using encryption.

100. The method of claim 90 wherein the user sensitive information comprises a personal identification number (PIN).

101. The method of claim 90 wherein the user sensitive information comprises a password.

* * * * *